United States Patent [19]

Glitz

[11] 4,032,763

[45] June 28, 1977

[54] PRODUCTION OF PSEUDO-RANDOM BINARY SIGNAL SEQUENCES

[75] Inventor: Ekkehard Glitz, Backnang, Germany

[73] Assignee: Licentia Patent-Verwaltungs-GmbH, Frankfurt am Main, Germany

[22] Filed: Oct. 30, 1975

[21] Appl. No.: 627,312

[30] Foreign Application Priority Data

Oct. 31, 1974 Germany .................. 2451711

[52] U.S. Cl. ................ 235/152; 331/78
[51] Int. Cl.² ........................... G06F 1/00
[58] Field of Search .......... 235/152; 331/78; 178/22

[56] References Cited

UNITED STATES PATENTS

| | | | |
|---|---|---|---|
| 3,366,779 | 1/1968 | Catherall et al. | 235/152 |
| 3,633,015 | 1/1972 | Lee | 235/152 |
| 3,911,216 | 10/1975 | Bartek et al. | 178/22 |
| 3,920,894 | 11/1975 | Shirley et al. | 178/22 |

Primary Examiner—David H. Malzahn
Attorney, Agent, or Firm—Spencer & Kaye

[57] ABSTRACT

A pseudo-random binary sequence having a long period duration is generated by producing a plurality of respectively different first binary signal sequences, supplying at least one of the first signal sequences to at least one input of a feedback connected shift register having an original signal sequence in order to produce an interfering signal which alters the signal sequence being produced by the shift register, and interchanging the first signal sequences supplied to the shift register under the control of signals from a setting program and/or control signals derived from the signal sequences produced in the course of the process. When more than one shift register output is employed, the signals at the outputs are linked together by a logic circuit to form the pseudo-random binary signal sequence of long duration.

20 Claims, 12 Drawing Figures

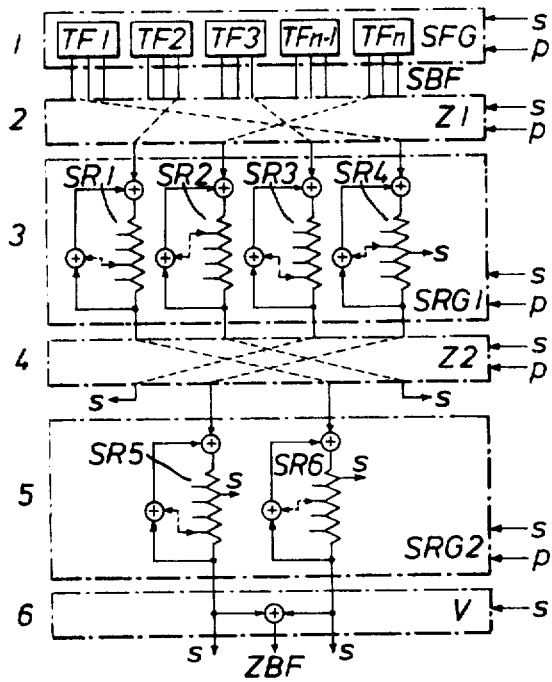
FIG.1
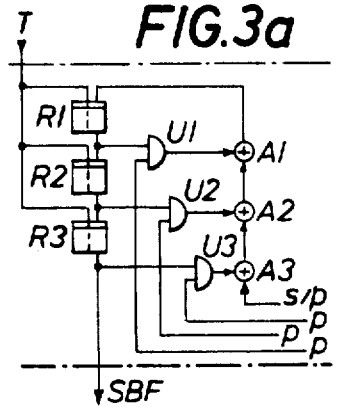
FIG.3a
FIG.3b
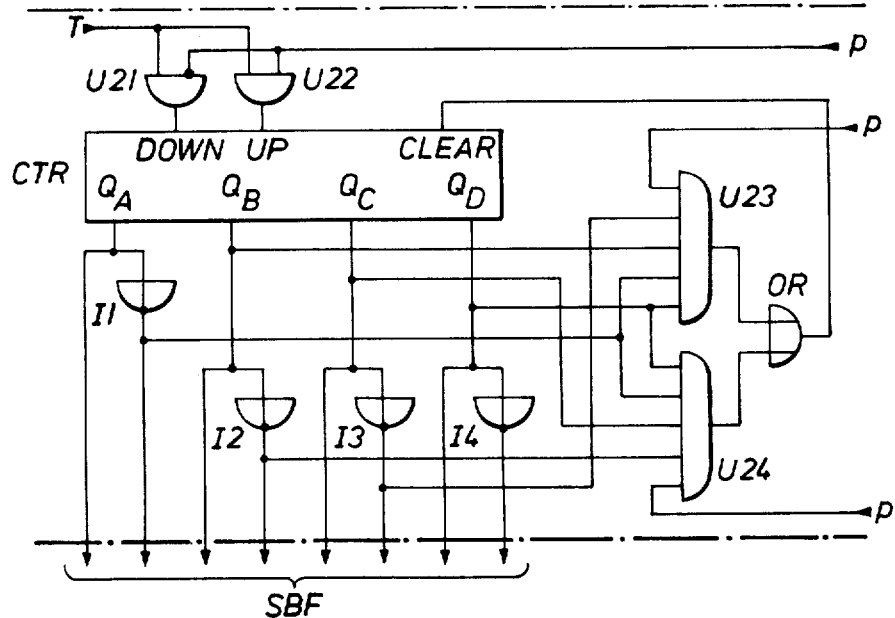
FIG.2

4,032,763

PRODUCTION OF PSEUDO-RANDOM BINARY SIGNAL SEQUENCES

BACKGROUND OF THE INVENTION

The present invention relates to the production of long period pseudo-random binary signal sequences.

Pseudo-random sequences of binary signals are used in modern information processing techniques for various purposes. They are employed, for example, as noise signals, as test signals for transmission paths, and as code sequences for encoding information.

For the latter cases it is necessary to have pseudo-random sequences of binary signals of extremely long period durations which can be formed simultaneously, i.e. in rigid phase relationship, at the transmitting end as well as at the receiving end with the aid of a program. The laws for forming such sequences must be complex enough that no matter how long the sequence of bits to be received and evaluated, the further continuation of the bit sequence under consideration must not be predictable with the aid of modern computer systems.

Methods and circuits are known for producing pseudo-random binary signal sequences employing binary counters or feedback connected shift registers. Sufficiently long periods can be produced with relatively low cost circuits by suitable linkage of the signals from a plurality of counters or shift registers if the period durations of the pulse sequences furnished by the individual counters or shift registers have no common divisor with one another. After linkage, there then results a total period duration which is equal to the product of the lengths of the periods or of the partial pulse sequences furnished to the individual counters or shift registers, respectively. The period duration is usually given by the number of binary bits within one period.

More or less complex linkage circuits produce from the partial pulse sequences a total pulse sequence with pseudo-random properties. Statistical testing processes can be used to determine certain characteristics of a pseudo-random pulse sequence, and thus the degree to which such a pulse sequence approximates the ideal case of a true random sequence can be measured.

There are already a number of disclosures, for example in German Offenlegungsschrift (Laid-Open Application) No. 2,341,627, British Patent No. 1,155,546 and U.S. Pat. No. 3,515,805, of procedures for coding data, i.e. pulse sequences, by means of so-called "scramblers," which in this particular case are understood to mean linearly feedback connected shift registers through which the text to be coded or decoded is channeled. With the same shift register arrangement as at the transmitting end, it is possible to cancel out the coding at the receiving end.

Such an arrangement is not suited for a higher degree of coding since when an N position shift register is used it will be possible to calculate the length and type of connection of the feedback connected shift register on the basis of 2N received bits and thus to break the code. German Auslegeschrift (Published Application) No. 1,537,062 discloses a code generator in which scramblers, which can also be described as shift register converters, are used to improve pseudo-random "primary" pulse sequences by converting them to "secondary sequences." The operating sequence of the shift register, which is originally given by the feedback loop, is interfered with by the primary pulse sequences fed thereinto so that the shift register emits a new secondary sequence having a longer duration. The drawback of this arrangement is that the resulting improvement can systematically be cancelled out by simulation of the shift register arrangement, so that also in this case the characteristics of the primary sequence can be recognized to enable the operator to break the code.

German Auslegeschrift No. 1,257,843 also discloses a code generator in which one or a plurality of shift registers are provided which are connected into a ring and whose individual stages are connected together via so-called mixers. Signals obtained from the terminals of a binary counter chain are fed into these mixers in dependence on various state criteria. A long counter chain and a long shift register are provided to produce a pseudo-random behavior of the sequence circulating in the shift register. However, the signals at the terminals of a counter chain are not independent of one another and thus a greater or lesser amount of subperiods will occur within the total period so that the result no longer has the required random characteristic.

The desired properties of pseudo-random binary signal sequences, briefly outlined above, i.e. long duration, e.g. $>10^{30}$ bits; statistical test behavior, i.e. approaching genuinely random sequences; a plurality of setting possibilities by means of programs; complex laws for formation; repeatability; high operating speed; and possibility for realizing them with economically justifiable expenditures, cannot be met entirely by any of the known solutions with a sufficient degree of dependability.

SUMMARY OF THE INVENTION

It is therefore an object of the present invention to provide a method which meets all of these requirements.

The process of the present invention, which achieves this object, produces pseudo-random binary signal sequences of long duration with the use of at least one feedback connected shift register whose sequence of operation, which is originally controlled by the feedback connection, is interfered with by a binary signal sequence fed into the shift register and is characterized in that at least one of a plurality of different binary signal sequences is fed as interfering signals via controlled associators to at least one input of each shift register; that the associators are controlled by signals from a setting program and/or by control signals derived from the binary signal sequences produced in the course of the process; and that the output signals of the one or a plurality of shift registers, when there is more than one shift register output, are linked together by a logic circuit to form the pseudo-random binary signal sequence of long duration.

BRIEF DESCRIPTION OF THE DRAWING

FIG. 1 is a simplified circuit diagram of one embodiment of a complete arrangement for producing a binary signal sequence of the above-described type according to the invention.

FIG. 2 is a block circuit diagram of one embodiment of a counter which may be used as one of the partial sequence generators TF of interference sequence generator SFG of FIG. 1.

FIG. 3a is a block circuit diagram of one embodiment of a shift register which could be used alternatively as one of the partial sequence generators TF of interference sequence generator SFG of FIG. 1.

FIG. 3b is a block circuit diagram of one embodiment of one shift register SR in one of the shift register groups SRG.

Figure 4:
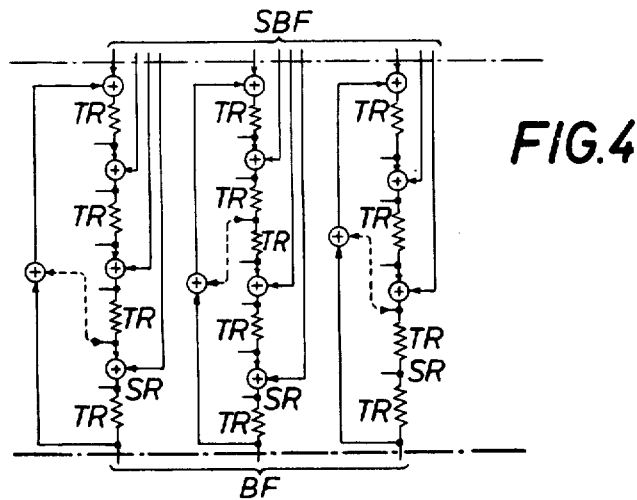
FIG. 4 is a circuit diagram of another embodiment of a shift register group which could be employed in the system of FIG. 1.

It should be noted that in the Figures and in the description the designation BF means any sequence. If such a sequence is destined or used as an interfering sequence it is marked by SBF. Only a sequence with sufficient properties of randomness after a final process is marked by ZBF. Thus the designation of the same sequence may be different at the output of one operational group from that at the input of the next one.

DESCRIPTION OF THE PREFERRED EMBODIMENTS

FIG. 1 shows an exemplary complete arrangement for practicing the method according to the invention, the circuit operation progressing from the top to the bottom of the drawing. The circuit is subdivided into operational groups each enclosed by a dot-dash box.

The first group is an interference sequence generator SFG, which includes a series of partial sequence generators TF1 . . . TFn, the second group includes a first associator circuit Z1, two possible embodiments of which are shown in FIGS. 6, the same being true for the second associator circuit Z2 in the fourth operational group. The third operational group includes a first shift register group SRG1 including four feedback connected shift registers SR1, SR2, SR3, SR4, the fifth operational group includes a second group of shift registers SRG2 composed of two feed-back connected shift registers SR5, SR6. The sixth operational group V includes at least one logic circuit.

The partial sequence generators and the shift registers are clock pulsed in the usual manner according to a sequence which will become apparent from the following discussion.

Each one of the above-mentioned operational groups is controlled by program signals $p$ and/or control signals $s$. Program signals $p$ are signals which, for a certain duration, e.g. during the transmission of a message, remain unchanged while control signals are signals that are derived at certain points in the arrangement. For example in the illustrated circuit, control signals are produced at various shift registers SR1 . . . SR6. Therefore the control signals $s$ consist in a sequence of pseudo-random binary pulses which may change value from one clock pulse period to the next.

In the Figures, the signals which may differ in composition but which can be interchanged for one another are uniformly identified with $p$ or $s$, respectively, without further differentiation. In the simplified FIG. 1 only one input is shown for program signals $p$ and one input is shown for control signals $s$, respectively, for each operational group whereas in practice several inputs for different signals may be provided.

As concerns the sequence generators and the shift registers, the duration of the periods furnished by them without interference can be controlled, as can the terminals employed and the feedback, while the alternating association of the individual inputs to the outputs can be controlled by control logic in the associator circuits. The circuits of the control logic control the type of linkage, or the program and/or control signals can be included in the logic. A more detailed control logic is shown only in FIG. 2. A control logic SL may associate various ones of the control signals $s$ it receives, for example in dependence on the program signals, with certain points of the individually employed operational groups. Furthermore it may serve to exclude certain linkages or to block them.

Figure 6A:
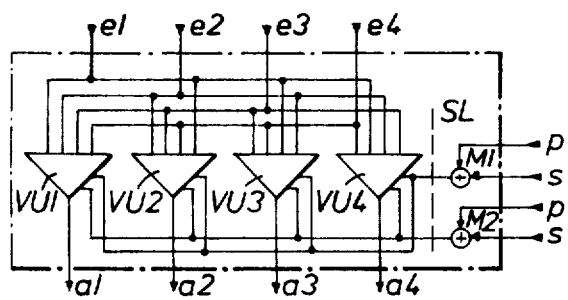
FIGS. 6a and 6b are circuit diagrams of two possible embodiments of the associator Z used in an arrangement for the process according to the invention.
Figure 6B:
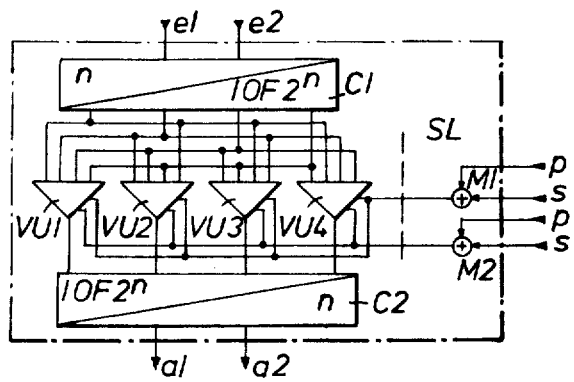

The simple exemplary control logic circuits SL shown in FIGS. 6a and 6b complete a more complex control logic contained in the stated type of a suitable multiple switch.

The partial sequence generators TF1 . . . TFn of the interference sequence generator SFG may be binary counters or feedback connected shift registers.

If they are binary counters, their counting direction (up or down) and their counting period, given by a counter end address, can be determined, by program signals $p$. Different counter end addresses are set for each one of the partial sequence generators, i.e. the address for each counter sets the counter to effect a sequence of counts equal in number to a respective prime number or a product of prime numbers.

FIG. 2 is a simplified circuit diagram showing the configuration of a binary counter circuit which can be used as a partial sequence generator and which includes, for example, a known four stage counter CTR, Type SN 74193, manufactured by Texas Instruments, USA. This counter has an "up" input, a "down" input, a "clear", or reset, input and four outputs $Q_A \ldots Q_D$. Depending on the value of a program signal $p$ a selected one of two AND-circuits U21 and U22, the AND-circuit U21 receiving the program signal via an inverting input, is activated allowing the clock pulse T to cause the counter to count down or up. Each one of the four outputs delivers another sequence. Four more sequences can be obtained from the same outputs via inverters 11 . . . 14. The counter end addresses are determined by the connection of the inputs of the AND circuits U23 and U24, respectively, with selected non-inverted or inverted outputs of the counter CTR. In the illustrated example, the AND circuit U23 responds to the counter position 11 and the AND circuit U24 to the counter position 13. At any time only one AND circuit is activated by program signal $p$. The output signal of one of the AND circuits resets, via an OR circuit OR the, counter to its start position.

Five-stage binary counters with controllable counter end address can produce pulse sequences with period durations corresponding to the prime numbers 3, 5, 7, 11, 13, 17, 19, 23, 29 and 31 and the prime number products 15 and 21. Each counter stage produces two inverse binary signal sequences SBF, i.e. each five-stage counter with a respective one of the set counter end addresses 17, 19, 21, 23, 29 or 31 can furnish ten different binary signal sequences, while five-stage counters each having a respective one of the above-mentioned end addresses produce a total of 50 different binary signal sequences.

A known feedback connected shift register which can also be used as a partial sequence generator differs substantially from the described counter in that: the duration of the period is not determined by an end address but by the number of series-connected binary flip circuits contained in the feedback loop, the place of a tapping point between two of the flip stages and the type and thus operation of the logic circuit inserted at least between two other of the flip stages, and with a given feedback only one pulse sequence can be obtained but this can be applied at any desired point in the circuit. Pulse sequences obtained at various points of the circuit differ only in their phase position.

If the feedback network is designed appropriately, the n-stage shift registers furnish periods of a maximum length of $2^n-1$ binary values, or bit combinations, if no interfering pulse sequence is introduced. Of particular advantage with respect to the statistical properties of the generated sequences and the economical design of the feedback networks are linear feedback networks which produce period lengths of $2^n-1$.

Thus, for the formation of long-duration periods, the pulse sequences furnished by the individual pulse sequence generators must have no common divisor in the number of their binary values per period. This is achieved by making the number of different bit combinations, or binary values, per period a prime number or the product of a few prime numbers. This results in the following possibilities for shift registers able to produce $n$ bit combinations where $n$ is, for example, a maximum of 31, which possibilities all meet the above-mentioned criteria:

| Number of binary stages, n | Bits per Period $2^n-1$ | Number of binary stages, n | Bits per Period $2^n-1$ |
|---|---|---|---|
| 3 | 7 | 17 | 131,071 |
| 5 | 31 | 19 | 524,287 |
| 7 | 127 | 23 | 47 × 178,481 |
| 9 | 7 × 73 | 29 | 233 × 1103 × 2089 |
| 11 | 23 × 89 | 31 | 2,147,483,647 |

At any one time no more than one shift register or counter in the entire arrangement must furnish a pulse sequence which influences the output signal and has one of the various possible period durations.

The periods of maximum duration which can be produced by a feedback-connected shift register can be realized by various feedback circuits and with various binary signal sequences.

Program signals $p$ may be used to control the effective length of the shift register, i.e. the number of flip stages contained in the cycle, and the tapping points.

Two embodiments of controllable shift registers are shown by way of example and in greater detail in the FIGS. 3a and 3b. In both FIGS. the register is composed of three series connected simplified register stages R1 . . . R3, each constituted by a bistable stage, the content of which is shifted by a clock pulse T from one stage to the next, and whose output signals can be fed into the feedback loop in dependence on the state of the controlled AND stages U1 . . . U3 via modulo-2 adders A1 . . . A3 to reach the input of the first register stage R1. In practice each block R may consist of a part of one or of a series-connection of several commercial available circuits e.g. Type SN 74195, manufactured by Texas Instruments, USA. The last switched-through AND circuit in the series determines the number of active stages and thus the maximum possible period duration of the binary signals sequence emitted by the shift register.

One or a plurality of switched-through AND circuits preceding the last one determines the type of feedback.

The shift register shown in FIG. 3a, suited to work as a partial sequence generator in the interference sequence generator SFG, may operate autonomously, i.e. without the introduction of interfering signal sequences. In this case the last modulo-2-adder may be short-circuited or a constant program signal can be supplied to it. By introduction of a control signal $s$ in the last modulo-2-adder the period duration of the interfering binary signal sequence SBF, being produced will be lengthened.

The shift register shown in FIG. 3b, which can be used in operational groups SRG1 or SRG2, respectively, includes a further modulo-2-adder A4 connected via its output to the input of the first register stage R1. An interfering binary signal sequence SBF can be introduced into the shift register via adder A4. The introduction of an interfering binary signal sequence into the shift register, however, can in principle occur at any point of the loop, for example via adder A3, as shown, in the form of a control signal $s$.

In the simplified illustration of FIG. 1, the shift registers SR1 . . . SR6 in operational groups SRG1 or SRG2, respectively, can each receive, via a modulo-2-adder, only one interfering pulse sequence SBF and it is also shown that the modulo-2-adder in its feedback loop can receive an input signal alternatingly from selected stages of the shift register, controlled either by program signals $p$ or by control signals $s$.

Figure 5:
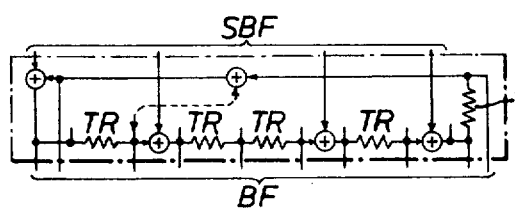
FIG. 5 is a circuit diagram of another embodiment of such shift register group.

FIG. 4 shows another embodiment of a shift register group composed of several feedback-connected shift registers SR each subdivided into a plurality of partial registers TR which simultaneously receive a plurality of different pulse sequences via modulo-2-adders each interposed between two succeeding stages. Such a shift register, as shown in FIG. 5, can furnish different binary signal sequences at various points. A single shift register may then be sufficient to function as one operational group SRG. Each partial register TR can be a simple shift register having one or more bit locations, provided that the total of bit locations is suited to deliver by feedback a period of maximal length.

The linkage of a plurality of binary signal sequences with different and not-commmon divisor period durations results in a binary signal sequence of a period duration equal to the product of the period durations of the binary signal sequences subject to the linkage.

Repeated linkages of various binary signal sequences having period durations with no common divisor permits the production of binary signal sequences having extremely long periods and the described control possibilities for counter and shift registers also permit a change in the individual binary signal sequences, and thus permit production of a binary signal sequence having an extremely long period duration, in a continuous and irregular manner.

For the further meeting of the above-mentioned criteria, the binary signal sequences to be linked are continuously interchanged with one another. This is done in that the binary signal sequences furnished by the individual partial sequence generators or shift registers, respectively, of one operational group can be introduced as interfering sequences to other feedback-connected shift registers or other inputs of a feedback-connected shift register in a continuous and irregular alternation by means of the associator circuits, i.e. in the illustrated embodiment of FIG. 1, by Z1 or Z2, respectively.

For the sake of simplicity, the associator circuits Z1 and Z2 are shown in FIG. 1 as providing selectively switchable lines.

Each associator circuit Z1, Z2 has a number of outputs which is equal to the number of pulses to be emitted by the associator at every instant as part of the pulse sequences. The ouput signals of the associator circuits may be utilized as interfering pulse sequences and/or as control signals. The number of inputs of each associator circuit is at least as great, except for one case which will be described below, as the number of outputs. It may be as great as the number of outputs of the preceding operational group. Controlled by program signals $p$ and/or control signals $s$, each one of the outputs can continuously be connected with successive ones of the inputs in irregular alternation.

The associators are electronic coupling matrices or a plurality of electronic multiple switches which are commercially available under various names, e.g. mullti-plexers or date selectors. Suitable types of multiple switches are manufactured by Texas Instruments, USA, and are sold e.g. under the designation "Dual-4-line-to-1 line Data Selector/Multiplexer SN 74153."

FIG. 6a is a circiut diagram of one embodiment of an associator with multiple switches. The arrangement has four inputs $e1$, $e2$, $e3$ and $e4$ and four outputs $a1$, $a2$, $a3$ and $a4$ and contains as many multiple switches as there are outputs, i.e. four multiple switches VU1, VU2, VU3 and VU4, and a control logic SL which is influenced by program signal $p$ and control signals $s$. The number of inputs of each multiple switch may be equal to or greater than the number of inputs of the associator. Each input $e$ of the associator is connected with one of the inputs of each multiple switch in such a manner that the individual lines from the inputs $e$ are connected with inputs of the switches with different order numbers. The output of each multiple switch leads to a respective one of the outputs $a$ of the associator and delivers binary signals to the next following operational group and/or control signals $s$ to any operational group. The signals from control logic SL establish a connection between the output of each switch VU and one of its inputs.

Influenced by the switch controlling signals each one of the outputs of the associator may be connected alternatingly in an irregular manner with a respective one of its inputs, except that no multiple connections can be made, i.e. two outputs $a$ cannot be connected to the same input. This is in the described example ensured since at any time all multiple switches have the same position and as each one of the inputs of the associator is connected with inputs of different order numbers of all multiple switches.

The utilization of all possibilities would require $n$ binary signals for the control of the multiple switches each with $n$ inputs. In the simplified diagram of FIG. 6a only two control lines to the "data select inputs" are shown and these are able to switch four different connections from the inputs $e$ to the outputs $a$.

The switch controlling signals may in the simplest case consist of two different control signals $s$ or can be obtained by mixing program signals $p$ and control signals $s$. In the illustrated embodiment the control logic SL contains two modulo-2-adder M1 and M2, respectively, each of which is fed by a program signal $p$ and different control signals $s$. Thus, depending on the value of the program signal $p$, the modulo-2- adder delivers the control signals $s$ unchanged or inverted.

The embodiment shown in FIG. 6a, is able to change the connections of the associators Z1 or Z2, indicated in FIG. 1, wherein not all possible outputs of the preceding operational group SBF are used. But more inputs in an associator are possible as multiples switches with more, and particularly at least 16, inputs are available.

A more complex mode for different connections between the inputs and outputs of an associator circuit permits the establishment of an arrangement as shown in FIG. 6b. This arrangement, which is provided with, for example, two inputs and two outputs, includes, in addition to four multiple switches VU1, VU2, VU3 and VU4 and the control logic SL, a code converter C1 between the inputs $e$ and the multiple switches VU on the one hand, and a code converter C2 between the multiple switches VU and the outputs $a$ on the other hand. The binary signals from $n$ different pulse sequences simultaneously being present at the $n$ inputs ($n$ here being 2) are fed to the $n$ inputs of the first code converter as $n$-digit binary numbers, are converted by the code converter to a (1 of $2^n$) code and the bits of this code are emitted at $2^n$ outputs. The second code converter C2 has $2^n$ inputs and $n$ outputs and forms from the (1 of $2^n$) code signals $n$-digit binary numbers whose individual digits are emitted via the $n$ outputs. Each one of the inputs of the second code converter C2 is connected with the output of one of $2^n$ multiple switches each having $2^n$ inputs. In this arrangment the number of inputs of the associator is equal to but not greater than the number of outputs.

In the simplified circuit diagram of FIG. 6b only two inputs and two outputs are shown. An associator with four inputs, as used in the arrangement of FIG. 1 would require 16 multiples switches with 16 inputs each.

As in the course of the process the number of the different sequences decreases from operational group to operational group down till but one final sequence in an associator according to FIG. 6b, not all of the available outputs are used for delivering interfering binary sequences. The remaining outputs are usefull as points for tapping control signals $s$.

The functioning and the control of the multiple switches in the arrangement according to FIG. 6b are identical with those described in connection with FIG. 6a.

The logic circuits in the sixth operational group V of FIG. 1 include, in the simplest case, as illustrated, one or a plurality of modulo-2-adders which link the binary signal sequences emitted by the preceding operational group together, it being possible to incorporate control signals $s$ into this linkage. It is reminded that the control signals $s$ are also binary signal sequences.

Figure 7A:
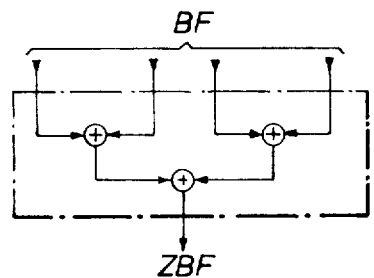
FIGS. 7a, 7b and 7c are circuit diagrams of three possible embodiments of logic circuits which can be used in an arrangement for the process according to the invention.

An example of a larger logic circuit is shown in FIG. 7a where four inputs are provided for binary signal sequences BF and control signals $s$ as well as three modulo-2-adders. In such a tree-like structure of a logic circuit in which always two binary signal sequences are combined in stages into a new binary signal sequence, the period duration becomes longer from stage to stage. If, as assumed, all of the binary signal sequences introduced into the logic circuit have different period durations, the period durations of the binary signal sequences available at the outputs of the individual modulo-2-adders of the individual stages also are different. Only the binary signal sequence emitted by the last stage has the maximum period duration which is equal to the product of the lengths of all of the binary signal sequences fed to the logic circuit. In the embodiment of a logic circuit shown in FIG. 7b a number of modulo-2-adders which is equal to the number of binary signal sequences to be linked is connected into a ring in such a manner that the output of each adder is connected with the first one of the two inputs of the subsequent adder. Each one of the second inputs of each adder receives one of the binary signal sequences to be linked. At the output of each one of the adders another binary signal sequence is available, always with the maximum period duration which is equal to the product of the durations of all of the binary signal sequences fed to the logic circuit.

In the above-described logic circuits, the signals which are simultaneously present at their inputs are linked together. In a further development of the process clock pulsed delay lines may be inserted between two modulo-2adders connected into a ring as described above and shown in FIG. 7b, the number of active stages of the delay lines again being controllable by program signals $p$ and/or control signals $s$. Such an arrangement is shown in FIG. 7c. Thus binary signal sequences which are present at the inputs at different times can be linked together and the binary sequences of one period can be changed.

In FIG. 1 the output of logic circuit V furnishes the desired pseudo-random binary signal sequence ZBF having an extremely long period duration.

Figure 7B:
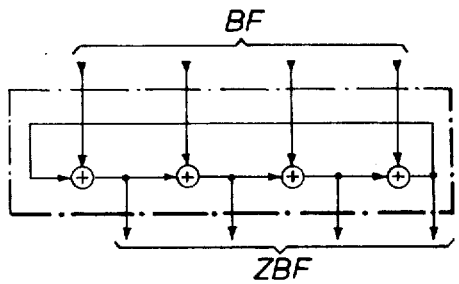
Figure 7C:
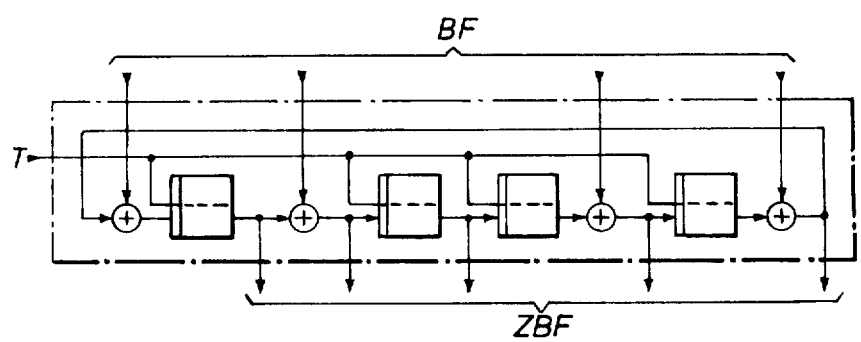

The logic circuits shown in FIGS. 7b and 7c furnish a number of different binary signal sequences of a uniform long period duration equal to the number of binary signal sequences having different, no-common-divisor period durations which it receives. In a further development of the above-described process, one or a plurality of the arrangements of FIG. 7b or FIG. 7c may be included in the arrangement of FIG. 1 before or after an associator circuit Z1 or Z2.

Figure 8:
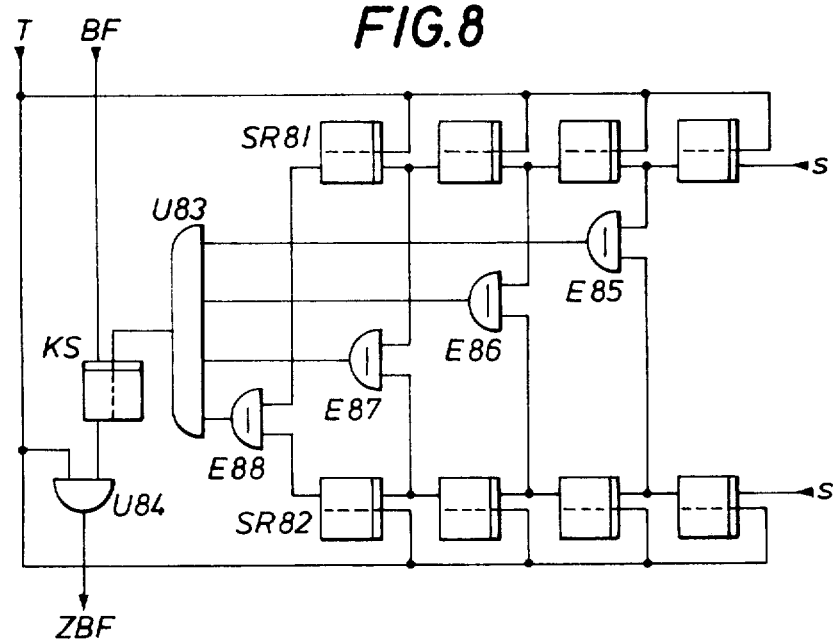
FIG. 8 is a circuit diagram of a possible embodiment of a circuit for the selection, in a pseudo-random manner, of individual signals out of a sequence.

Another embodiment of the above-described process provides that the resulting pseudo-random binary signal sequence ZBF only individual signals are separated for further utilization at instants which are determined in a pseudo-random manner. Such instants may be dependent on the simultaneous occurrence of identical signals or identical groups of signals consising of a plurality of successive signals in at least two different binary signal sequences produced during the course of the process. The number of bits in the groups of signals and/or the number of compared binary signal sequences is then determinative for the proportion of signals separated from the initially resulting binary signal sequence. An example of a pseudo-random selector circuit is shown in FIG. 8. The embodiment contains two shift registers SR81 and SR82, both pulsed by a clock T and both with e.g. four stages. Each shift register is fed with one of two different control signals $s$ or binary signal sequences. The contents of each stage of one register is compared with the contents of one and only one stage of the other register by means of EQUIVALENCE circuits E85 ... E88. If all of the compared couples of stage have the same contents all EQUIVALENCE circuits will deliver an output signal which will cause the AND circuit U83 to deliver a clock signal to the switch KS, e.g. a flip circuit. Only during this clock signal will the switch KS accept and store one digit out of the sequence BF which is also applied to the switch. Via a clock T-pulsed AND circuit U84 the sequence of selected binary signals is delivered to the output ZBF.

It will be understood that the above description of the present invention is susceptible to various modifications, changes and adaptations, and the same are intended to be comprehended within the meaning and range of equivalents of the appended claims.

What is claimed is:

1. Method for producing a pseudo-random binary signal sequence having a long period duration utilizing at least one feedback-connected shift register having an original sequence of operation which is influenced by a first binary signal sequence fed into the shift register in a manner to interfere with the original sequence of operation, comprising the steps of:
   producing a plurality of such first binary signal sequences and causing such sequences to differ from one another;
   feeding a selected one of the binary signal sequences as an operating sequence interfering signal to at least one input of the shift register by means of an electronically controllable associator circuit receiving the binary signal sequences and connected to at least one input of the shift register; and
   varying the connections effected by the associator circuit by at least one of: a setting program signal; and a control signal derived from binary signal sequences produced during the production of the psuedo-random sequence.

2. A method as defined in claim 1 wherein there are a plurality of such feedback-connected shift registers each having at least one input connected to the associator ciruit, and further comprising linking the output signals from the shift registers in a logic circuit to produce, at the output of the logic circuit, the pseudo-random binary signal sequence having a long period duration.

3. Method as defined in claim 2 wherein said step of linking is carried out by linking the output signals of the shift registers in pairs by means of at least one modulo-2-adder 4. Method as defined in claim 2 wherein said step of linking is carried out by connecting a chain of modulo-2-adders into a ring with the output of each adder of the chain being connected with a first one of the two inputs of the subsequent adder, and the second input of each adder being connected to receive the output signals from one of the shift registers, and causing a linked binary signal sequence to be available at the output of each adder.

5. Method as defined in claim 4 wherein said step of linking is further carried out by inserting clock-pulse controlled delay circuits between two of the modulo-2-adders which are connected into the ring.

6. Method as defined in claim 5 wherein said step of linking is further carried out by controlling the number of active stages in the delay circuits.

7. A method as defined in claim 2 further comprising: providing a plurality of further feedback connected shift registers each having an original sequence of operation; and feeding the output signal sequence from at least one of the first-recited shift registers as an operating sequence interfering signal to at least one input of each further shift register by means of a second electronically controllable associator circuit connected between the outputs of the first-recited shift registers and the inputs of the further shift registers, and wherein said step of linking is carried out by connecting the logic circuit to the outputs of the further shift registers for linking the output signals from the further shift registers to produce the pseudo-random binary signal sequence.

8. Method as defined in claim 2 further comprising selecting from pseudo-random binary signal sequence only individual signals in a pseudo-random manner for further utilization.

9. Method as defined in claim 8 wherein said step of selecting is carried out by determining the simultaneous occurrence of identical signals or identical groups of signals of a plurality of consecutive signals in at least two different binary signal sequences produced in the course of the process.

10. Method as defined in claim 1 wherein the period durations of the first signal sequences and the original signal sequences of the shift register have no common divisor.

11. Method as defined in claim 1 wherein said step of connecting is carried out to feed a plurality of the first binary signal sequences to a plurality selected individual stages of the shift register.

12. Method as defined in claim 1 wherein the step of producing the first binary signal sequences is carried out in the individual stages of binary counters which are switched by a clock pulse.

13. Method as defined in claim 12 wherein the step of producing includes controllably varying the final counting states of the binary counters.

14. Method as defined in claim 1 wherein said step of producing first binary signal sequences is carried out using feedback connected shift registers.

15. Method as defined in claim 1 wherein the shift register has $n$ stages and is provided with a feedback connection so that the binary signal sequences furnished by the shift register without the influence of interfering binary signal sequences has a period duration of $2^n-1$ bits.

16. Method as defined in claim 1 wherein the feedback connection of the shift register includes a controllable feedback network.

17. Method as defined in claim 1 wherein said step of connecting includes converting the plurality of first binary signal sequences to a 1 of $2^n$-code and then reconverting a changed pattern of the bits of that code from the 1 of $2^n$-code to an n-digit binary number, and feeding the individual bits of that number to $n$ separate outputs as the associator circuit.

18. Method as defined in claim 1 wherein said step of connecting includes mixing the first binary signal sequences together to form a plurality of mixed sequences and feeding a selected mixed sequence to the at least one input of the shift register.

19. Method as defined in claim 18 wherein said step of mixing is carried out by connecting a chain of modulo-2-adders into a ring with the output of each adder of the chain being connected with a first one of the two inputs of the subsequent adder, and the second input of each adder being connected to receive a respective one of the first binary signal sequences, and causing a linked binary signal sequence available at the output of each adder.

20. A system for producing a pseudo-random binary signal sequence having a long period duration, comprising:
means generating a plurality of first binary signal sequences composed of respectively different bit value patterns;
first electronically controllable associator circuit means having a plurality of inputs connected to receive respective ones of the first binary signals, said associator further having a plurality of outputs and selective connection means for establishing a selected, variable, connection pattern between its inputs and its outputs;
means including: at least one shift register presenting an original signal forming sequence and having an input connected to an output of said associator circuit means for receiving a binary signal sequence acting to interfere with the original sequence; and an output providing such pseudo-random sequence; and
means connected to said associator circuit means for providing actuating signals for varying the connection pattern between said associator circuit means inputs and outputs.

* * * * *